Dec. 16, 1924.
T. H. CLEGG
1,519,191
INDUSTRIAL TRUCK
Filed Oct. 20, 1921   6 Sheets-Sheet 1
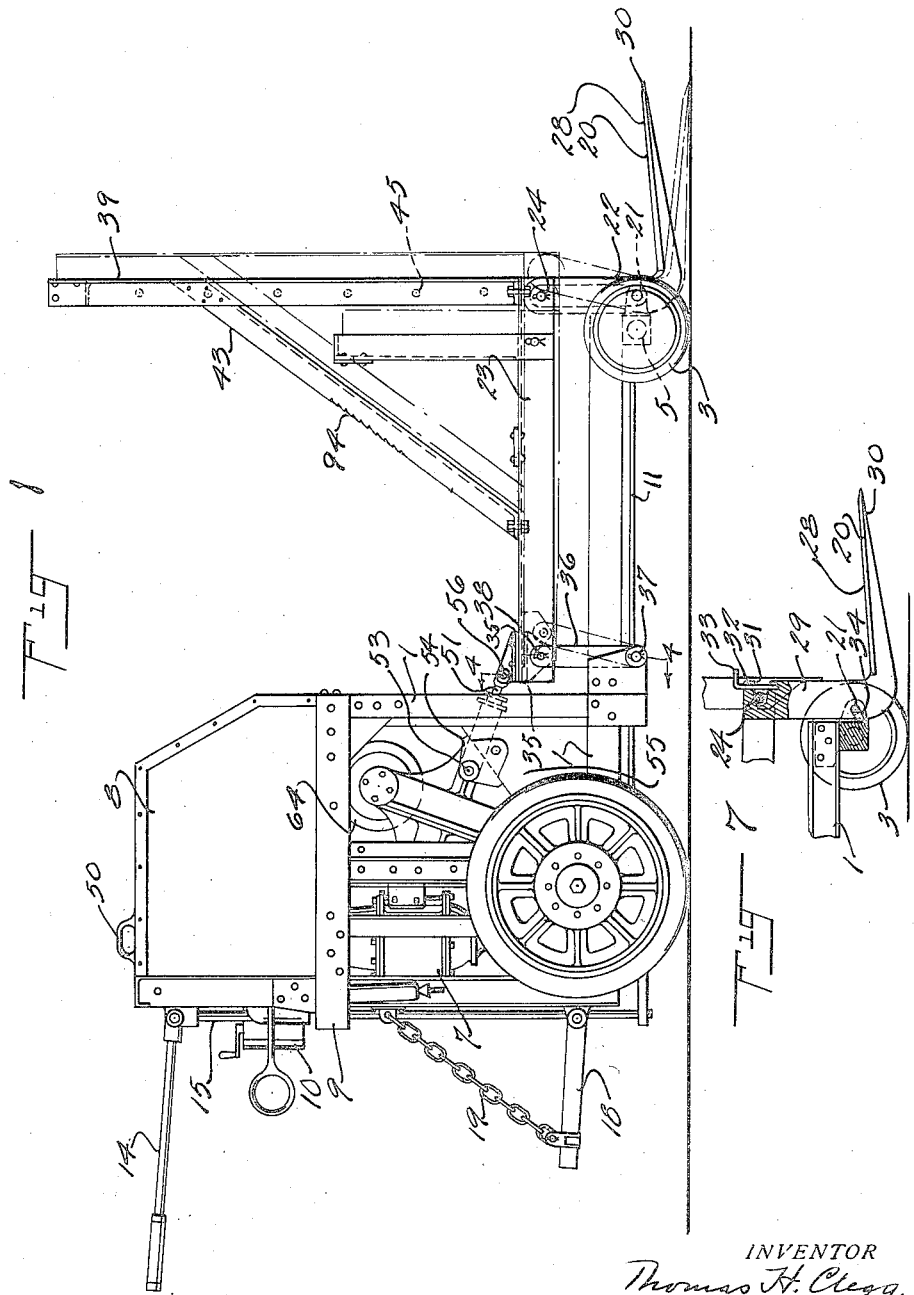
INVENTOR
Thomas H. Clegg,
BY
ATTORNEY Dec. 16, 1924.
T. H. CLEGG
1,519,191
INDUSTRIAL TRUCK
Filed Oct. 20, 1921    6 Sheets-Sheet 2
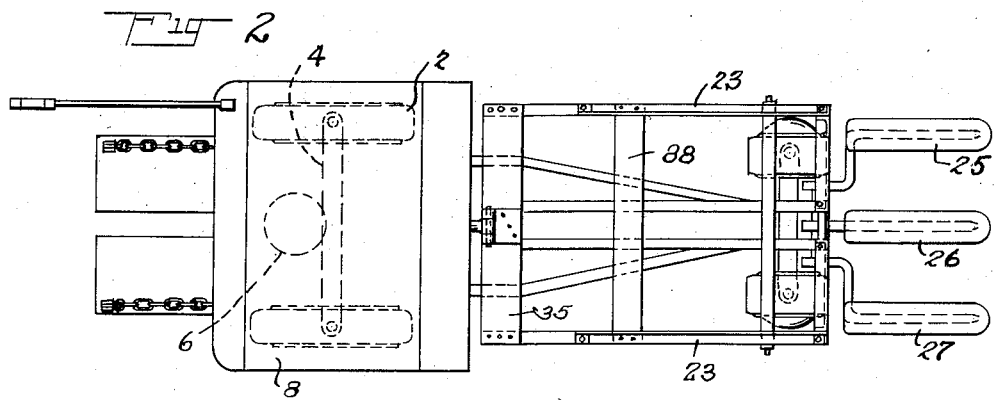
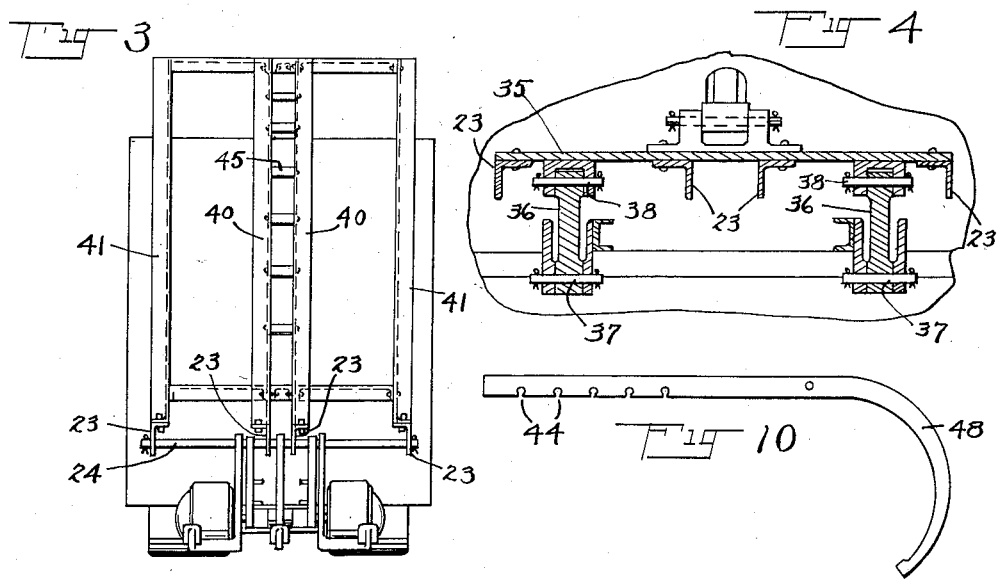
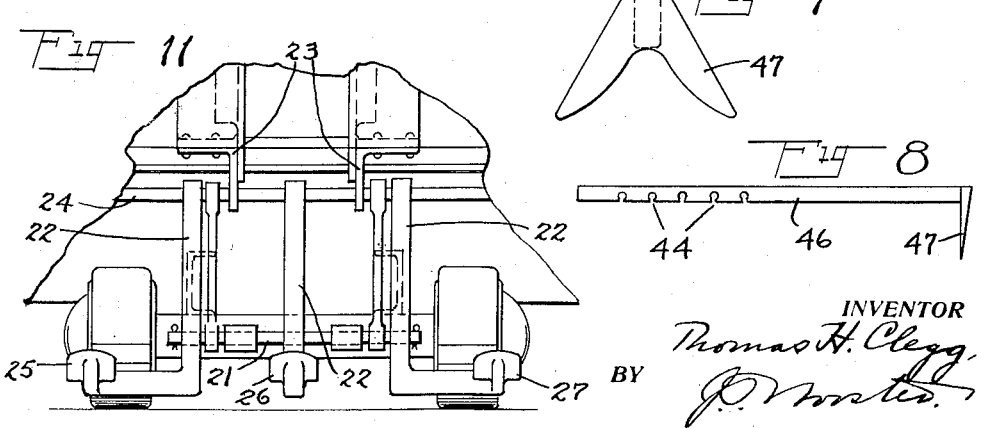
INVENTOR
Thomas H. Clegg
BY
ATTORNEY

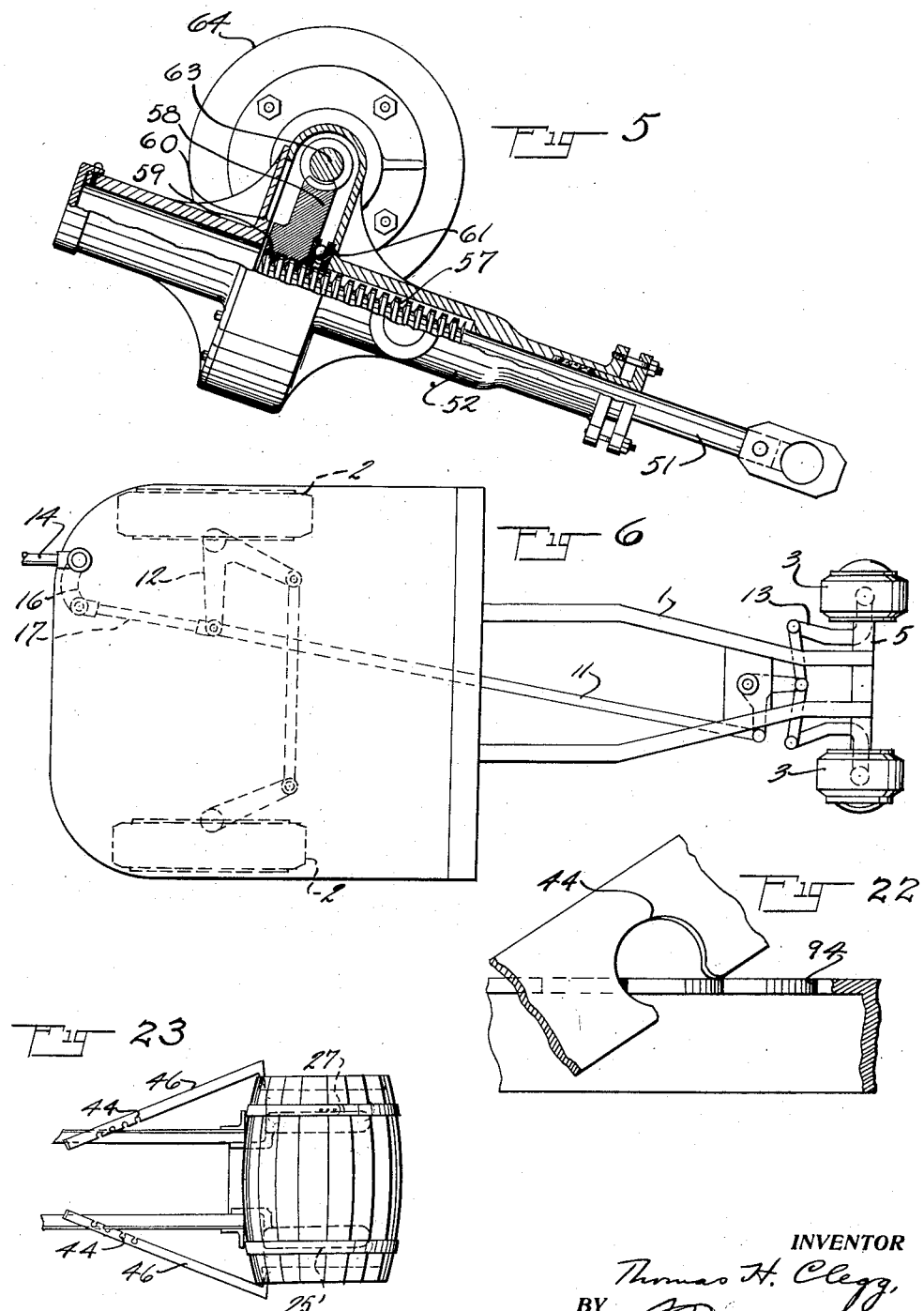

Dec. 16, 1924.　　　　　　　　　　　　　　　　　1,519,191
T. H. CLEGG
INDUSTRIAL TRUCK
Filed Oct. 20, 1921　　　　6 Sheets-Sheet 4
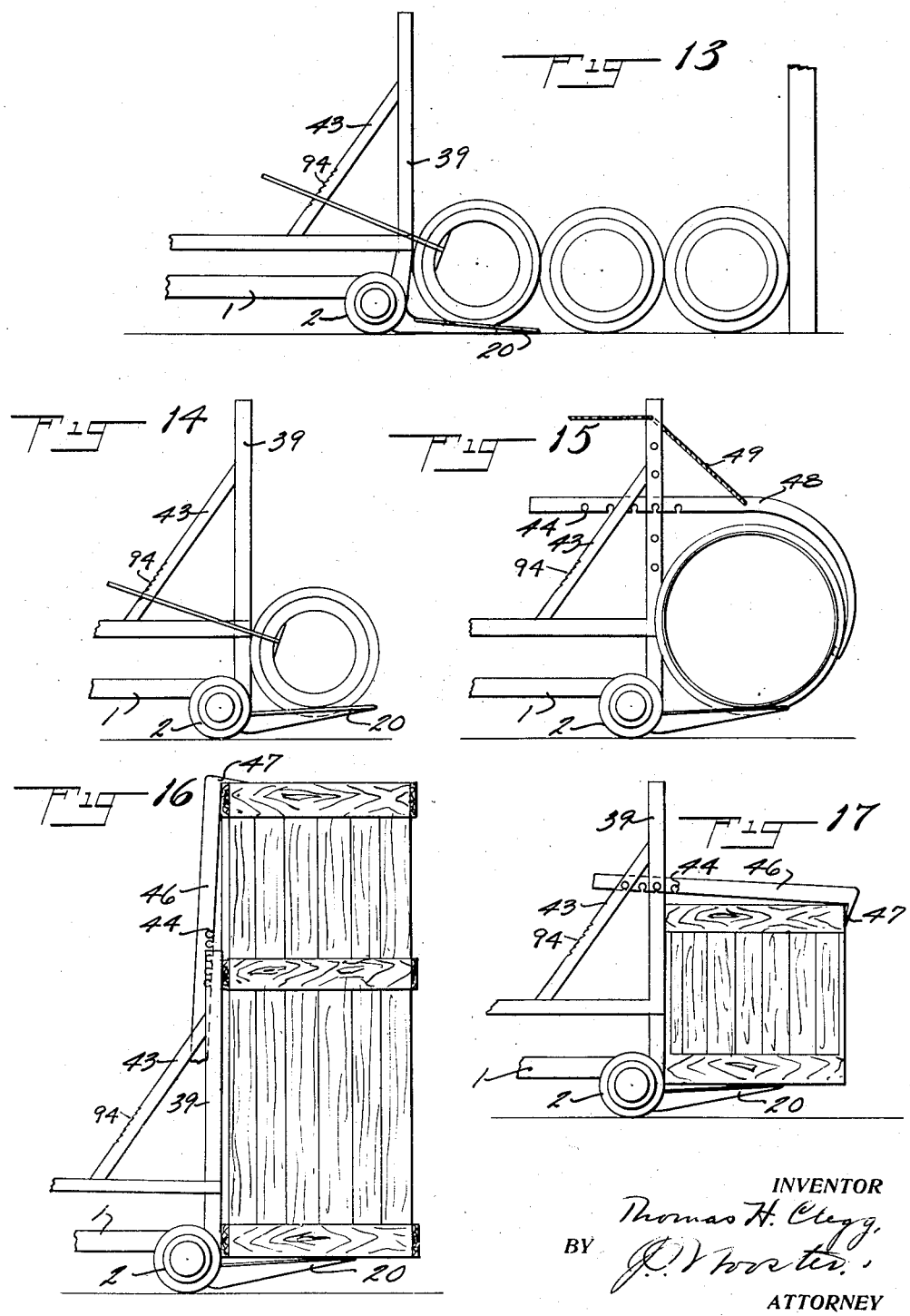
INVENTOR
Thomas H. Clegg,
BY
ATTORNEY

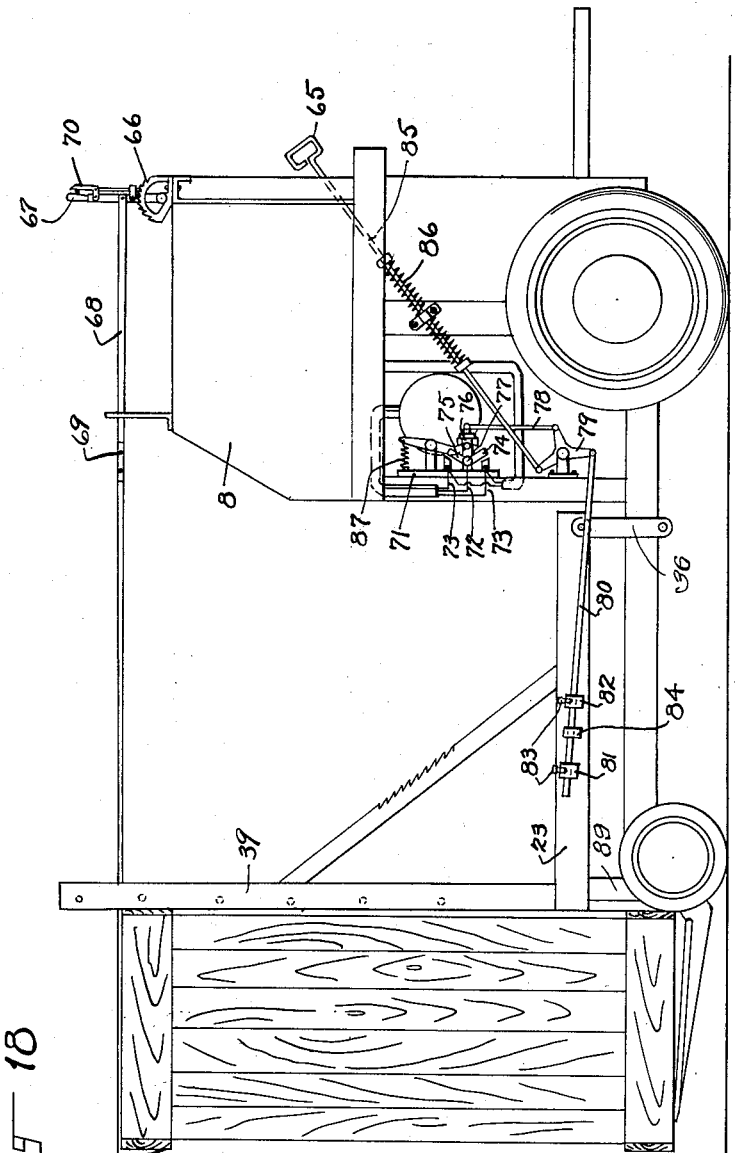

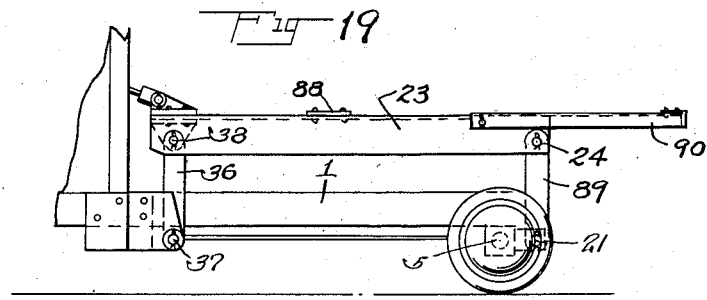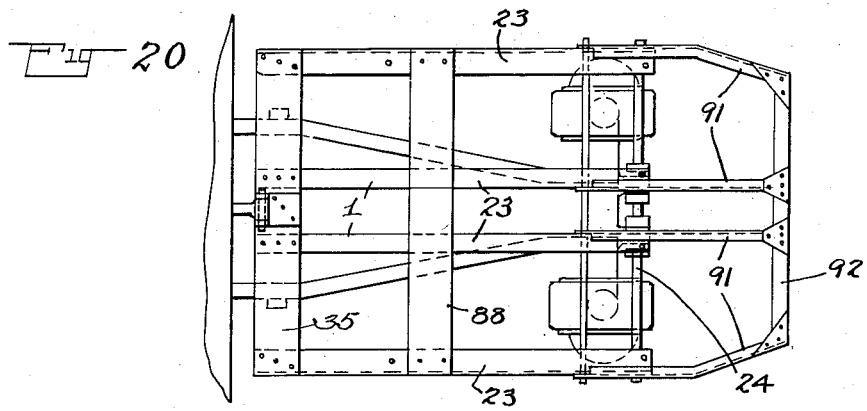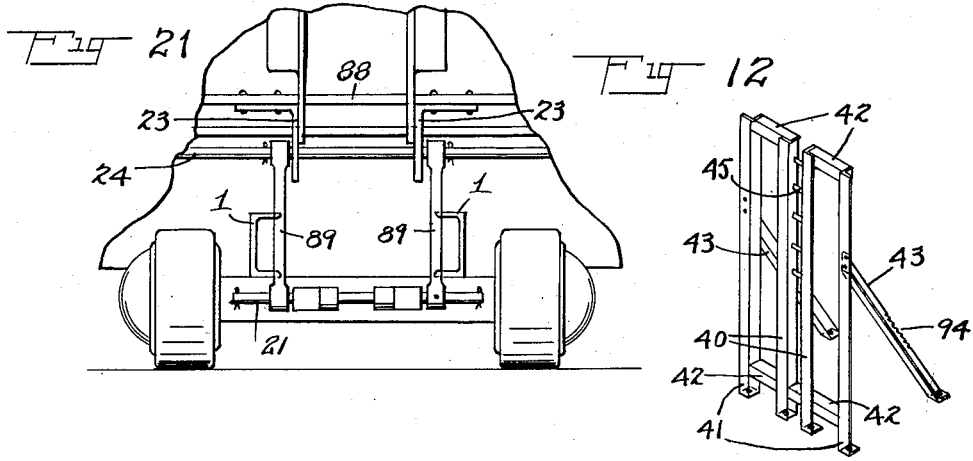

Fig. 6 is a plan view of the frame and wheels, showing the steering arrangement.

Fig. 7 is a detail of one of the detachable fingers.

Fig. 8 is a detail of a grappling iron.

Fig. 9 is an enlarged end view of the grappling iron shown in Fig. 8.

Fig. 10 is a detail of a different type of grappling iron.

Fig. 11 is a detailed end elevation of the fingers.

Fig. 12 is a perspective view of the demountable upright load support.

Figs. 13 to 17 inclusive show the operation of the fingers and use of the grappling irons with various types of load.

Fig. 18 is a side elevation of the truck in action, showing the grapple tensioning feature and the automatic stop.

Fig. 19 is a side elevation showing how the device may be converted into a standard lifting truck.

Fig. 20 is a plan view of the parts shown in Fig. 19.

Fig. 21 is a detailed end view of certain parts shown in Figs. 19 and 20, and

Figs. 22 and 23 illustrate the use of grapples in the ends of casks.

Referring to the drawing, 1 indicates the truck frame mounted on driven wheels 2 and trailing wheels 3 by axles 4 and 5 respectively. Maintained in housing 6 and connected up with axle 4 is the usual differential driving gear, driven in the usual way by a shaft from motor 7. Storage batteries 8, carried on an elevated platform 9 on frame 1, furnish the power for motor 7, subject to the operation of controller 10. All four wheels are dirigible, having the usual steering knuckles and the driving shafts in axle 4 having universal connections with driving wheels 2. Steering is effected by link 11 connected to bell cranks 12 and 13, connected in the usual manner to the steering knuckles of wheels 2 and 3 respectively. Link 11 is itself actuated by steering bar 14, which, through shaft 15 oscillates rocker arm 16, link 17 being pivotally connected at its ends with arm 16 and link 11 respectively. Hinged driver's platform 18 is supported by chain 19 from frame 1.

The lifting platform comprises longitudinal members 23 and cross members 35, 88 rigidly secured together and mounted at the rear on parallel links 36 carried by bar 37 on frame 1 and at the front on similar links 89 carried by bar 21 on axle 5, so arranged that when the links swing forward (to right in Fig. 1) the lifting platform lowers, and vice versa. The upper ends of links 89 are carried by a bar 24 mounted in members 23. The tapered wedge shaped fingers 25, 26, 27 are fulcrumed on bar 21 and are similar to bell cranks, the long tapered ends projecting forward to wedge under a load resting directly on a floor, and the short upturned ends being engaged with bar 24 so as to be actuated thereby, and thus by the lifting platform operating mechanism which is connected to the rear cross member 88. In outer members 25 and 27, the upturned ends 29 are laterally offset from the respective load supporting surfaces 28, while in the intermediate member 26, upturned end 29 is in the plane of the center-line of surface 28, as shown in Fig. 2. This permits all three ends 29 being closely spaced on pivot bar 24 which connects the ends of links 23 aforesaid, while the three load supporting surfaces 27 may be widely spaced to afford an ample base of support for the load. Each of the upturned ends 29 of the three longitudinal members is fulcrumed, as aforesaid, on pin 21 carried by the frame 1. Each of surfaces 28 is preferably stiffened by a flange, which tapers off toward the unsupported end 30, at which the member is slightly bevelled to facilitate insertion beneath heavy objects.

Members 25, 26 and 27 are made readily detachable by substituting slots for the ordinary holes for pins 21 and 24, as shown in Fig. 7. Slot 31 for bar 24, adjacent the top of end 29, opens on the side toward which surface 28 extends, and is crossed by hole 32 bored downwardly from the top of end 29 to accommodate retaining pin 33. Slot 34 for bar 21 opens on the opposite side of end 29, and inclines downwardly, or in a direction other than normal to a line connecting the two slots, so that members 25, 26 and 27 will not slip off bar 21 by rotation about bar 24. In attaching, slot 34 is always first engaged with bar 21, and member 26 is rotated about bar 21 to bring slot 31 into engagement with bar 24, after which retaining bar 33 is inserted. The reverse is performed to disengage the members 25, 26 or 27. Members 25, 26 and 27 are slightly loose on bar 24 to conform to floor inequalities, but still acting as a load support. In lifting, all three fingers are simultaneously actuated by bar 24. As shown, all three members are wedge shaped, and heavy, so as to be driven under loads by momentum.

Mounted on the ends of members 23 adjacent bar 24 is upright load-supporting member 39 consisting of four parallel columns substantially in the same plane. These columns, comprising an inner pair 40 and an outer pair 41, are bolted to members 23. Columns 40 and 41 are respectively connected together at top and bottom by a cross bracing 42. Upright member 39 is supported against longitudinal forces by a pair of diagonal braces 43, bolted at their lower ends to links 23 and serrated as at 94. Connecting inner upright members 40, which are spaced a short distance apart, are a plurality of transverse pins 45, spaced at suitable intervals.

For holding the load against falling off the front of the fingers I employ grappling irons 46, shown in Fig. 8, having notches 44, to engage pins 45, or for a use later to be explained. Irons 46 have prongs 47 to engage the load, prongs 47 being preferably double, as shown in Fig. 9, and adapted to engage the corners of boxes and the ends of casks. In Figs. 22 and 23 is shown the use of serrations 94 in grappling the ends of casks. In Fig. 10 is shown a modified form of grappling iron 48 adapted for cylindrical articles or casks, and also having notches 44, as shown in Fig. 15. A rope 49, secured near the hooked portion of iron 48, and passing up through top member 42 to a cleat 50 fixed to frame 1 and within easy reach of the operator, provides for release of iron 48 from the load. A manual grapple tensioning device is also provided, as shown in Fig. 18. A toothed sector 66 is bolted to the frame structure over batteries 8 and within easy reach of the operator. Lever 67 is pivoted on the center of sector 66, and link 68 is pivoted at one end to lever 67, the opposite end of link 68 being adapted to engage coupling pin 69 whereby said link is coupled to grapple 46 through notch 44 of the latter. A spring pressed dog 70 of ordinary design permits locking lever 67 in any desired position on sector 66. Grapples 46 are made in varying sizes, and by selecting grapple 46 of suitable length, the load may be drawn and held firmly against upright load support 39.

The lifting platform and fingers are actuated by a plunger 51, reciprocating in bearings in housing 52, the latter being mounted on trunnion bearings 53, carried in bearing blocks 54 mounted on triangular brace plates riveted to frame 1. Plunger 51 is pivoted at one end 56 to cross piece 35, the other end being threaded as at 57. A worm wheel 58 having a central threaded hole 59 engaging threads 57 on plunger 51, floats on the latter, and is retained in housing 52 by thrust bearings 60 and 61, the latter taking the thrust due to the load and being of the ball bearing type to reduce friction. A worm on motor shaft 63 meshes with wheel 58. Motor 64 is bolted to housing 52 and is movable, along with the latter, about trunnion 53. Motor 64 is driven by storage batteries 8 through controller handle 65, the latter being within easy reach of the driver.

An automatic stop is provided for motor 64, as shown in Fig. 18, through switch 71, which is a double knife switch, the two central poles 72 of which are always connected to the respective battery poles, and the four outer poles 73 of which are connected (in pairs of diagonal corners) to the respective poles of motor 64, which is reversible. Switch 71 is thus a polarity reversing device, and when lower blades 74 are engaged with respective poles 73, motor 64 turns in such direction as to raise platform 20, while engagement of upper blades 75 with their respective poles 73 will cause motor 64 to rotate in the opposite direction and to lower platform 20.

Movable element 76, having respective pairs of blades 74 and 75 secured thereto, is pivoted as at 77, one set of blades 74 and 75 being connected to one of poles 72, and the other set of blades 74 and 75 being connected to opposite pole 72. Link 78, pivoted at one end to element 76 at the opposite end to bell crank 79, controls the engagement of switch 71. Link 80, having a pair of spaced collars 81 and 82 adjustably secured thereto by set screws 83, is also pivoted to bell crank 79, and secured to one of links 23 is a collar 84 through which link 80 loosely fits, collar 84 being between collars 81 and 82. It will be seen that when the platform has been raised to a sufficient height, according to the adjustment of collar 82, the latter will be engaged by collar 84 and will disengage lower blades 74 through bell crank 79 and links 78 and 80, thereby stopping motor 64, while a similar engagement of collar 83 will have a like effect in stopping motor 64 when the platform is being lowered, collar 83 being adjusted to stop motor 64 when the platform reaches floor contacting position. Control rod 85 is pivoted at one end to bell crank 79 and secured at the opposite end to handle 65. Spring 86 secured to frame 1 and to rod 85 and acting through the latter, tends to hold switch 71 in neutral or disengaged position, as does also spring 87 acting through its lever on movable element 76; but the frictional engagement of the switch blades is sufficient to counteract springs 86 and 87 up to the point at which switch 71 is just about to disengage, whereupon a sudden release will occur and arcing over will be prevented.

Upright support 39 is detached by removing the bolts which secure it to members 23. Collars 81 and 82 must be adjusted to new positions as the travel of the platform will be greater than the fingers, if attached, would permit. It will be noted that the inner pair of members 23 are so disposed as to rest upon the longitudinal channel frame members 1 when in lowered position, the frame itself thus constituting an additional support at this point.

To provide a platform of more convenient length for handling skids or trailers, extension 90, comprising longitudinal members 91 and cross member 92, is hinged to members 23 by hinge bar 93 passing through the flanges of respective members 23 and longitudinal members 91, the top flanges of the latter being cut away adjacent bar 90 so as to clear members 23. When extension 90 is lowered, it is supported by bar 93 and by members 91 resting on links 23. By means of extension 90, a skeleton platform of any desired length may be obtained.

The operation of the device will be apparent from the foregoing description; and Figs. 13 to 17 illustrate several different ways of securing loads upon the fingers. It will be observed that as the fingers are raised the load is lifted, assuming that the fingers have been wedged or driven under the load by the movement of the truck. Many round packages, barrels, etc., discharge themselves by gravity when the fingers are tilted down, and roll gently to the desired point without handling or guidance, and angular packages can be deposited exactly where wanted. Also, several stacked bales and packages can be handled at once.

This wedging action will be controlled by the operator, and also checks the momentum of the truck. Many packages simply roll enough to abut against the vertical member, and do not require securing, but the lifting movement will draw grappling irons 46 or 48 forward and hold the load further on when said grappling irons are hooked to upright member 39, which constitutes a support in conjunction with the grappling irons, for top-heavy loads, such as crated pianos and the like. Owing to the lost motion of bar 24 in the slots 31 of the fingers, the tensioning of the grapples commences before the fingers are simultaneously lifted by engagement of bar 24 therewith at the rear ends of slots 31, and the tensioning increases as the fingers lift owing to the backward and upward movement of the grapples relatively to the vertical lift of the load on the fingers and against support 39. Grappling irons 46 and 48 may also be tensioned manually, as above described. Intermediate finger 26 may be detached so as to permit outside members 25 and 27 to pass beneath the raised ends of casks and the like, and to facilitate carrying of the same.

This machine constitutes a substantial advance over prior hand trucks used for moving barrels, crates, bales, etc., and the well known facility of handling and steering trucks of this type enables goods to be handled very rapidly and economically with one man, where several have previously been required. The disposition of weights is such that relatively large loads can be lifted, as the operator, the batteries and motor constitute one lever arm relatively to the wheels intermediate the load, and the load on the fingers to the adjacent wheels the other and shorter lever arm, with power applicable up to the limit of the motor and strength of parts. It thus becomes immaterial how much of the load overhangs or extends beyond the fingers, as the grapples can be used to hold the load against tilting off when lifted. With this machine there is a minimum of useless vertical lifting, as only a few inches clearance from the floor is sufficient to enable the load to be moved. Also many articles can be pushed around, with one edge sliding, without lifting the entire package. Also both the platform and the fingers can be used together to carry loads.

The operation of the device when converted into a lifting platform truck will be apparent from the foregoing.

In the following claims I employ the term "frame" to include the fixed axles and in general, all the structural, as distinguished from operating parts of the vehicle. The term "platform" is used broadly to denote a platform of any type whatsoever, and is not to be limited to platforms of the type shown except where so specified in the claims. "Longitudinal" denotes the normal direction of travel of the wheels, or a direction perpendicular to the axles.

What I claim is:

1. A dirigible motor driven industrial truck having lifting means at the forward end including relatively movable wedge shaped fingers conforming to floor inequalities to permit driving under and picking up a load on the floor, a motor for actuating said lifting means, and actuating connection between the motor and said lifting means.

2. A dirigible motor driven lifting platform industrial truck comprising a rigid underframe, propulsion wheels on said underframe, dirigible wheels, a platform mounted thereon having lifting means movable to raise and lower the same from and toward said underframe, wedge shaped lifting fingers of substantial length pivotally connected at the forward end of the truck and adapted to be raised and lowered by means of the platform, said fingers, underframe and platform being so relatively arranged and constructed that thrust strains are transmitted to the underframe, and the platform lifting means relieved thereof when the fingers are forcibly driven under a load on the floor to pick up and carry the same, and power means for driving the truck and actuating both the platform lifting means and the fingers.

3. A lifting platform industrial truck having a lifting platform, actuating means, a finger support at the front end of the truck, finger actuating means carried by the platform, and wedge shaped fingers pivoted on said support and connected to said finger actuating means.

4. An industrial truck having forwardly projecting wedge shaped fingers pivoted at the front end adjacent the floor, said fingers having upwardly extending actuating ends, said fingers and actuating ends forming bell crank levers, actuating means connected thereto, and a vertical load support mounted independently of the fingers to receive the rearward thrust of a load carried on the fingers.

5. A lifting platform industrial truck having a lifting platform, actuating means, finger pivoting means at the front end of the truck, and finger actuating means carried by the platform.

6. A lifting platform industrial truck having finger pivoting means at the front end, finger actuating means carried by the lifting platform, and lifting fingers adapted to be pivoted on said pivoting means and connected to said actuating means.

7. A lifting platform industrial truck having finger pivoting means at the front end, finger actuating means carried by the lifting platform, and lifting fingers adapted to be detachably pivoted on said pivoting means and detachably connected to said actuating means.

8. An industrial truck comprising a frame carrying at the forward end pivoted wedge shaped lifting fingers, means for raising and lowering the fingers, and grappling means mounted independently of the fingers tensioned by said finger actuating means for holding the load.

9. An industrial truck comprising a frame carrying at the forward end pivoted wedge shaped lifting fingers having upturned ends connected to an actuating mechanism, a vertical load support cooperating to support a load on the fingers and mounted independently of the fingers to move rearwardly as the fingers are lifted, and grappling means attachable to said support to tension a load as it is lifted by the fingers.

10. An industrial truck comprising a frame carrying at the forward end pivoted wedge shaped lifting fingers having upturned ends connected to an actuating mechanism, a vertical load support cooperating to support a load on the fingers and mounted independently of the fingers to move rearwardly and upwardly as the fingers are lifted, and grappling means attachable to said support to tension a load as it is lifted by the fingers.

11. In an industrial truck having wedge shaped load lifting fingers, and lifting means therefor, means permitting independent lowering movement of the fingers to accommodate floor inequalities.

12. An industrial truck comprising a frame carrying adjacent the forward end a plurality of independent wedge shaped lifting fingers, actuating means connected to said fingers and including a lost motion connection for each finger permitting limited independent lowering of said fingers to accommodate floor inequalities but simultaneous lifting when said lost motion is taken up.

13. An industrial truck comprising a frame carrying adjacent the forward end finger supporting means, wedge shaped bell crank fingers constructed to be intermediately mounted on said supporting means, actuating means, and means connecting said actuating means to the upper ends of said fingers, said means including a lost motion connection to each finger permitting limited independent lowering of said fingers to accommodate floor inequalities.

14. A dirigible industrial truck of the power actuated, lift platform type convertible to a pickup type, comprising a lift platform, finger supporting means at one end below the platform, wedge shaped fingers demountably supported by said supporting means, and means connecting the platform and the fingers to enable the latter to be demounted and to be actuated by the former.

15. A dirigible industrial truck of the power actuated, lift platform type convertible to a pickup type, comprising a lift platform, finger supporting means at one end below the platform, wedge shaped fingers demountably supported by said supporting means, and means separably connecting the platform and the fingers to enable the latter to be actuated by the former, said connecting means permitting independent lowering of the fingers to accommodate floor inequalities.

16. A dirigible industrial truck of the power actuated, lift platform type convertible to a pickup type, comprising a lift platform, an upright load support detachably mounted at the forward end, finger supporting means at said end below the platform, wedge shaped fingers demountably supported by said supporting means, and means separably connecting the platform and the fingers to enable the latter to be actuated by the former.

17. An industrial truck provided with a platform adapted to be raised and lowered while remaining substantially horizontal, power actuating means for said platform, and wedge shaped fingers pivotally secured to the truck adjacent one end of the platform and adapted to be forced under a load on the ground and actuated by said power means to pick up said load.

18. An industrial truck provided with a lifting platform mounted on parallel links, a plurality of wedge shaped fingers secured to the truck independently of the platform, and actuating means connected to simultaneously lift and lower the platform and fingers.

19. An industrial truck having a plurality of L-shaped fingers at one end adjacent the floor and adapted to be driven under a load on the floor, a pivotal support for the fingers adjacent their vertices, an upright load supporting member above the fingers for the attachment of grappling means for the loads carried by the fingers, said load supporting member being movable longitudinally of the truck as the fingers are raised and lowered.

20. A motor driven industrial truck provided with wedge shaped fingers adapted to be driven under and pick up a load on the ground, grappling devices for retaining a load on said fingers, and a single means for raising and lowering the fingers and for tensioning and slacking the grappling devices as the fingers are raised and lowered.

21. An industrial truck having a plurality of fingers pivoted thereto and adapted to be driven under a load on the floor, power means for lifting and lowering the fingers, each of said fingers being loosely connected so as to move independently when lowered to conform to irregularities in the contour of the floor.

22. An industrial truck having a lifting platform, actuating means, and pivoted lifting means overhanging an end portion of said truck, connected to be actuated with said platform and formed with a projecting wedge shaped portion to be driven under and pick up a load on the floor.

23. An industrial truck provided with a plurality of broad flat wedge shaped lifting fingers tapered to an edge and pivoted adjacent one another at one end of the truck to be driven under a load on the floor, the fingers being mounted to drop independently when lowered to conform to floor inequalities.

24. An industrial truck having a plurality of L-shaped fingers pivoted adjacent their vertices to be driven under a load on the floor, the lower portion of each finger being wedge shaped and longer than the upright portion, and a bar movably mounted to engage the upright portions for raising and lowering the fingers.

25. A detachable finger member for an industrial truck having a flat tapered longitudinal carrying portion and an upturned attaching portion at an angle to said longitudinal portion, an intermediate pivoting portion, said upturned portion having a slot adjacent its free end opening in the direction toward which said longitudinal member extends.

26. A wheeled power driven industrial truck having a frame, a lifting platform carried over said frame, demountable tiltable fingers pivoted to one end of the frame, said fingers having a wedge section to be driven under a load, actuating means, and an extension member on said lifting platform adapted to be extended over the end of the frame on which said fingers are normally pivoted, when the latter are demounted.

27. An industrial truck, comprising demountable fingers outside the wheel base, a platform above the axles, and means for raising and lowering said platform and fingers, said platform having a movable extension adapted to be moved out of the way of said fingers when the latter are in operation.

28. In combination with an industrial truck having a platform over the wheel base and self-loading fingers outside the wheel base, an upright load support on said first platform adjacent the fingers for supporting the load on the latter, said support being detachable to permit use of said platform when said fingers are not in use.

29. An industrial truck provided with a lifting platform mounted on parallel links, a plurality of wedge shaped fingers secured to the truck independently of the platform, and actuating means including a lost motion connection to simultaneously lift or lower the platform and fingers and to permit the fingers to conform to floor inequalities.

30. An industrial truck comprising a frame carrying adjacent the forward end finger supporting means, flat wedge shaped bell crank fingers constructed to be mounted independently of each other on said supporting means, actuating means, and means connecting said actuating means to the upper ends of said fingers by a lost motion connection.

31. In a truck, the combination with a frame, a raisable platform, parallel links connecting the platform with the frame, a tilting support adapted to be projected beneath and pick up a load, pivotal connections between the support and the frame, and relatively movable connections between the support and the platform, whereby raising the platform may swing the support upwardly.

32. In a device of the class described, the combination with a truck frame, of a raisable platform mounted thereon, a transverse member carried by the platform, another transverse member carried by the frame, means for moving the platform relative to the frame, and a carrier projecting forwardly of the platform and associated with said members whereby movement of said platform controls the operation of said carrier.

Signed at Brooklyn, in the county of Kings and State of New York, this 19th day of October, A. D. 1921.

THOMAS H. CLEGG.